(12) United States Patent
Fang et al.

(10) Patent No.: US 10,885,365 B2
(45) Date of Patent: Jan. 5, 2021

(54) METHOD AND APPARATUS FOR DETECTING OBJECT KEYPOINT, AND ELECTRONIC DEVICE

(71) Applicant: BEIJING SENSETIME TECHNOLOGY DEVELOPMENT CO., LTD, Beijing (CN)

(72) Inventors: Zhiwei Fang, Beijing (CN); Junjie Yan, Beijing (CN)

(73) Assignee: BEIJING SENSETIME TECHNOLOGY DEVELOPMENT CO., LTD, Beijing (CN)

(*) Notice: Subject to any disclaimer, the term of this patent is extended or adjusted under 35 U.S.C. 154(b) by 109 days.

(21) Appl. No.: 16/423,076

(22) Filed: May 27, 2019

(65) Prior Publication Data
US 2019/0279014 A1 Sep. 12, 2019

Related U.S. Application Data

(63) Continuation of application No. PCT/CN2017/118868, filed on Dec. 27, 2017.

(30) Foreign Application Priority Data

Dec. 27, 2016 (CN) .......................... 2016 1 1227629

(51) Int. Cl.
*G06K 9/00* (2006.01)
*G06F 13/00* (2006.01)
(Continued)

(52) U.S. Cl.
CPC ............. *G06K 9/2054* (2013.01); *G06K 9/46* (2013.01); *G06K 9/62* (2013.01); *G06K 9/6202* (2013.01);
(Continued)

(58) Field of Classification Search
USPC ....... 382/100, 103, 106–107, 155, 162, 168, 382/173, 181, 219, 224, 232, 254, 174,
(Continued)

(56) References Cited

U.S. PATENT DOCUMENTS

2011/0081082 A1* 4/2011 Jiang .................. G06K 9/00765 382/170
2015/0082349 A1* 3/2015 Ishtiaq ............... H04N 21/4884 725/40
(Continued)

FOREIGN PATENT DOCUMENTS

CN 101159018 A 4/2008
CN 102262724 A 11/2011
(Continued)

OTHER PUBLICATIONS

Chen D. Ren S, Wei y et al "Joint Cascade Face Detection and Allignment" European Conference on Computer Vision. Springer Internation Publishing 2014: 109-122.*
(Continued)

*Primary Examiner* — Seyed H Azarian
(74) *Attorney, Agent, or Firm* — Syncoda LLC; Feng Ma (57) ABSTRACT

A method and an apparatus for detecting an object keypoint, an electronic device, a computer readable storage medium, and a computer program include: obtaining a respective feature map of at least one local regional proposal box of an image to be detected, the at least one local regional proposal box corresponding to at least one target object; and separately performing target object keypoint detection on a corresponding local regional proposal box of the image to be detected according to the feature map of the at least one local regional proposal box.

18 Claims, 9 Drawing Sheets

(51) Int. Cl.
  *G06K 9/20* (2006.01)
  *G06K 9/46* (2006.01)
  *G06K 9/62* (2006.01)
  *G06N 3/08* (2006.01)
  *G06T 3/40* (2006.01)
  *G06N 3/04* (2006.01)

(52) U.S. Cl.
  CPC ......... *G06K 9/6232* (2013.01); *G06K 9/6256* (2013.01); *G06K 9/6262* (2013.01); *G06N 3/04* (2013.01); *G06N 3/08* (2013.01); *G06T 3/40* (2013.01); *G06K 2209/21* (2013.01)

(58) Field of Classification Search
  USPC ....... 382/276, 170, 190, 156, 305, 321, 291; 725/40
  See application file for complete search history.

(56) References Cited

U.S. PATENT DOCUMENTS

| | | | |
|---|---|---|---|
| 2016/0307057 A1 | 10/2016 | Li et al. | |
| 2017/0147905 A1* | 5/2017 | Huang | G06K 9/6232 |
| 2017/0220854 A1* | 8/2017 | Yang | G06K 9/522 |
| 2017/0289624 A1* | 10/2017 | Avila | H04L 65/604 |
| 2018/0137642 A1* | 5/2018 | Malisiewicz | G06K 9/00201 |

FOREIGN PATENT DOCUMENTS

| | | |
|---|---|---|
| CN | 103679159 A | 3/2014 |
| CN | 105718879 A | 6/2016 |

OTHER PUBLICATIONS

International Search Report in the international application No. PCT/CN2017/118868, dated Mar. 29, 2018.
English translation of the Written Opinion of the International Search Authority in the international application No. PCT/CN2017/118868, dated Mar. 29, 2018.
Chen D, Ren S, Wei Y, et al. Joint cascade face detection and alignment[C]//European Conference on Computer Vision. Springer International Publishing, 2014: 109-122.
Andriluka M, Pishchulin L, Gehler P, et al. 2d human pose estimation: New benchmark and state of the art analysis [C]//2014 IEEE Conference on Computer Vision and Pattern Recognition. IEEE, 2014: 3686-3693.
Deng J, Dong W, Socher R, et al. Imagenet: A large-scale hierarchical image database[C]//Computer Vision and Pattern Recognition, 2009. CVPR 2009. IEEE Conference on. IEEE, 2009: 248-255.
Ren S, He K, Girshick R, et al. Faster R-CNN: Towards real-time object detection with region proposal networks[C]// Advances in neural information processing systems. 2015: 91-99.

\* cited by examiner

METHOD AND APPARATUS FOR DETECTING OBJECT KEYPOINT, AND ELECTRONIC DEVICE

CROSS-REFERENCE TO RELATED APPLICATIONS

This application is a continuation of International patent application No. PCT/CN2017/118868 filed on Dec. 27, 2017, which claims priority to Chinese Patent Application No. CN201611227629.5, filed on Dec. 27, 2016. The disclosures of these applications are hereby incorporated herein by reference in their entirety.

BACKGROUND

A keypoint of an object refers to a part on the object that has stable and important semantic information. Object keypoint detection is extremely important for helping deep analysis on an object, and thus it is widely applied in behavior recognition, tracking and human re-authentication.

SUMMARY

The present disclosure relates to the field of computer vision technologies, and in particular, to a method and an apparatus for detecting an object keypoint, an electronic device, a computer-readable storage medium, and a computer program.

Embodiments of the present disclosure provide a method and an apparatus for detecting an object keypoint and an electronic device, so as to perform keypoint detection on various objects in images of different scenes.

A method for detecting an object keypoint provided according to one aspect of the embodiments of the present disclosure includes: extracting from an image to be detected, at least one local regional proposal box corresponding to a target object; obtaining a feature map for each of the at least one local regional proposal box; and detecting target object keypoints on each of the at least one local regional proposal box in the image to be detected according to the feature map for each of the at least one local regional proposal box.

An apparatus for detecting an object keypoint further provided according to another aspect of the embodiments of the present disclosure includes: a processor; a memory for storing instructions executable by the processor; wherein the processor executes the instructions to implement the following operations: extracting from an image to be detected, at least one local regional proposal box corresponding to a target object; obtaining a feature map for each of the at least one local regional proposal box; and detecting target object keypoints on each of the at least one local regional proposal box in the image to be detected according to the feature map for each of the at least one local regional proposal box.

An apparatus for detecting an object keypoint further provided according to another aspect of the embodiments of the present disclosure includes: a feature map obtaining module configured to obtain a feature map for each of multiple local region proposal boxes in an image to be detected, the multiple local region proposal boxes corresponding to at least one target object; and a keypoint detection module configured to detect target object keypoint on each of the at least one local regional candidate box in the image to be detected according to the feature map of each local region proposal box obtained by the feature map obtaining module.

An electronic device is further provided according to yet another aspect of the embodiments of the present application. The electronic device includes: a processor, a memory, a communication element, and a communication bus, where the processor, the memory, and the communication element communicate with one another by means of the communication bus; and the memory is configured to store at least one executable instruction which causes the processor to execute corresponding operations of the method for detecting an object keypoint as provided above.

A computer program further provided according to yet another aspect of the embodiments of the present application, including computer instructions, where when the computer instructions run in a processor of a device, the processor executes corresponding operations of the method for detecting an object keypoint as provided above.

A non-transitory computer readable storage medium is further provided according to yet another aspect of the embodiments of the present disclosure, having a computer program stored thereon, wherein the computer program comprises computer instructions, when the computer instructions being executed by a processor in the electronic device, implements the method for detecting an object keypoint as provided above.

According to the method and apparatus for detecting an object keypoint, the electronic device, the computer readable storage medium, and the computer program provided in the embodiments of the present disclosure, the influence of a background on object detection can be effectively inhibited, and application can be made to complex application scenes, for example, where objects overlap with each other, and keypoint detection in an image will not be influenced even when the position of an extracted local regional proposal box is not accurate.

BRIEF DESCRIPTION OF DRAWINGS

The accompanying drawings constituting a part of the specification describe embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Exemplary embodiments of the present disclosure are now described in detail with reference to the accompanying drawings.

Figure 1:
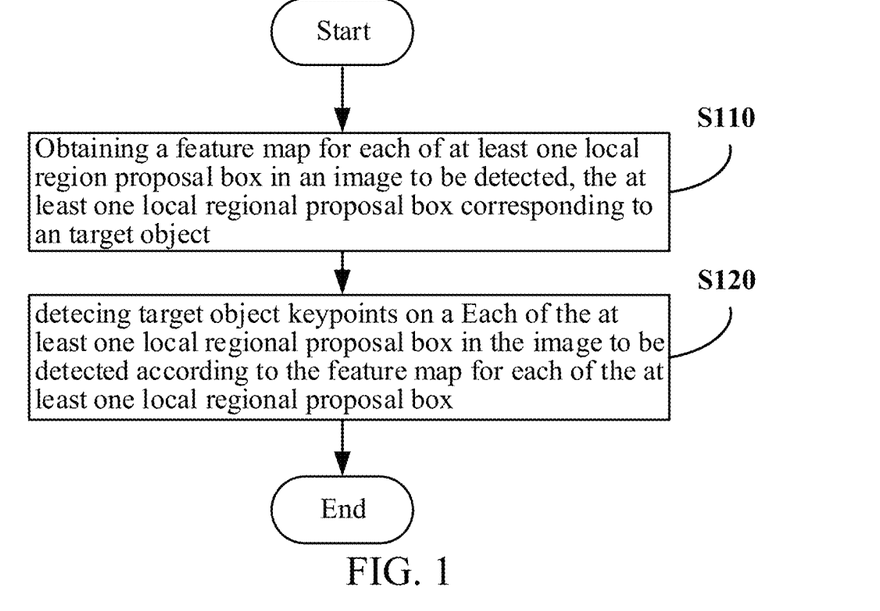
FIG. 1 is a flowchart of a method for detecting an object keypoint according to an embodiment of the present disclosure.

FIG. 1 is a flowchart of a method for detecting an object keypoint according to an embodiment of the present disclosure.

Referring to FIG. 1, at block S110, a feature map for each of at least one local regional proposal box in an image to be detected is obtained, the at least one local regional proposal box corresponding to a target object.

For example, respective feature maps of multiple local regional proposal boxes in the image to be detected are obtained, the multiple local regional proposal boxes corresponding to one or more target objects. For another example, a respective feature map of a local regional proposal box of the image to be detected is obtained, the local regional proposal box corresponding to one or more target objects.

In order to detect a target object (such as a pedestrian, a human face, and a vehicle) in an image, it is common to firstly extract at least one local regional proposal box that includes the object from the image to be detected. Multiple local regional proposal boxes of the target object are extracted from the image in existing region extraction methods (such as a regional proposal network and a convolutional neural network), and information such as confidence levels and prediction probabilities of these local regional proposal boxes can be further obtained in the process of extracting the local regional proposal boxes. For example, 300 local regional proposal boxes can be extracted from each image by using the regional proposal network.

Multiple different objects can be captured from an image, and thus the extracted local regional proposal box can include multiple objects. In the method for detecting an object keypoint provided in the embodiments of the present disclosure, one or more target objects to be detected can be determined in advance, for detecting keypoints of these target objects in the image to be detected in subsequent processing.

Then, multiple image processing methods can be used to obtain the feature map indicative of an image feature of the local regional proposal box. For example, it includes, but is not limited to, obtaining the feature map corresponding to each local regional proposal box at a certain convolution layer by performing convolution on the image to be detected; and on the other hand, it is also available to obtain the feature map generated for the image to be detected.

At block S120, target object keypoints are detected on each of the at least one local regional proposal box in the image to be detected according to the feature map of at least one local regional proposal box. For example, target object keypoint detection is performed on the corresponding local regional proposal box in the image to be detected according to the feature map of each local regional proposal box.

The obtained feature map of the local regional proposal box indicates a feature response in the box, and thus in the block, analysis and detection are performed for the local regional proposal box extracted from the image so as to predict whether each local regional proposal box has the keypoint of the target object. A feature response degree in the local regional proposal box can be analyzed in multiple feature map processing modes, so as to locate the keypoint of the target object.

Most of the current keypoint detection technologies detect the keypoint by analyzing the image feature of the entire image. Most of these keypoint detection methods are applicable to an ideal application scene, that is, a situation where a complete target object is manually extracted and scaled to a fixed size and there is only one type of target object. However, the environment in an actual scene is complex: more than one object in different sizes needs to be tracked in an image, the objects overlap with each other, and the spatial structures of keypoints of different objects are incompatible. If keypoint detection on multiple objects is performed in an actual scene with these complex situations, the detection result is not accurate and the effect is not satisfactory.

The method for detecting an object keypoint according to the embodiments of the present disclosure relates to predicting the keypoint of at least one target object on the basis of the feature map of the local regional proposal box of the object predicted from an image, so as to implement universal object keypoint detection. Such universal object keypoint detection implemented according to the feature response of the local regional proposal box can effectively inhibit the influence of a background on object detection, and thus can be applied to complex application scenes, for example, where objects overlap with each other, and keypoint detection in an image will not be influenced even when the position of an extracted local regional proposal box is not accurate.

Figure 2:
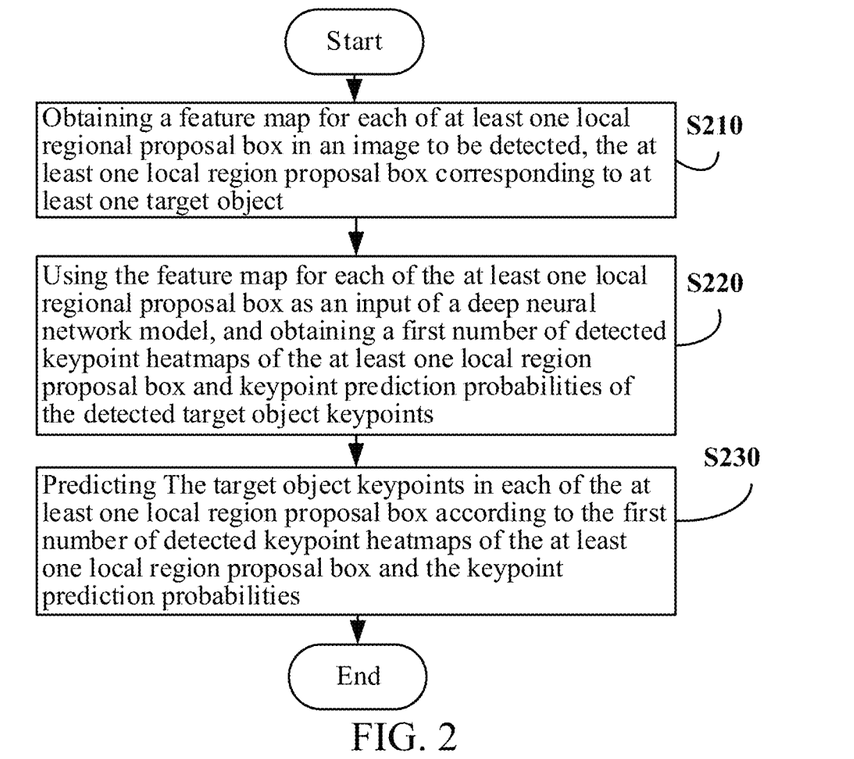
FIG. 2 is a flowchart of a method for detecting an object keypoint according to another embodiment of the present disclosure.

FIG. 2 is a flowchart of a method for detecting an object keypoint according to an embodiment of the present disclosure.

Referring to FIG. 2, at block S210, a feature map for each of at least one local regional proposal box in an image to be detected is obtained, the at least one local regional proposal box corresponding to at least one target object. For example, respective feature maps of multiple local regional proposal boxes in the image to be detected are obtained, the multiple local regional proposal boxes corresponding to one or more target objects.

As stated above, the feature map of each local regional proposal box can be obtained in multiple modes. For example, a feature map of the image to be detected is obtained, and then the feature map of each local regional proposal box is separately cut from the feature map of the entire image according to the position of each local regional proposal box. For another example, each local regional proposal box image is separately cut from the image to be detected according to the position of each local regional proposal box, and a feature map of each local regional proposal box image is separately obtained. The feature map of each of these local regional proposal boxes can reflect an image attribute feature of each local regional proposal box.

In previous processing, before the feature map of the image to be detected or the feature map of each local regional proposal box image is obtained, the image to be detected or each local regional proposal box image can be scaled, so that the image to be detected or each local regional proposal box image is stretched or reduced to a predetermined size to obtain the corresponding feature map by using the image to be detected or each local regional proposal box image of a uniform size.

At block S220, the feature map for each of the at least one local regional proposal box is used as an input of a pre-trained deep neural network model, and a first number of detected keypoint heatmaps for the at least one local regional proposal box and keypoint prediction probabilities of the detected target object keypoints are obtained, for example, the feature map of each local regional proposal box is used as the input of the pre-trained deep neural network model, and the first number of detected keypoint heatmaps of each local regional proposal box and keypoint prediction probabilities of the detected target object keypoints is obtained. The first number is a total number of predetermined keypoints of the at least one target object, and the deep neural network model is configured to predict the first number of detected keypoint heatmaps of the regional proposal box of the object and the keypoint prediction probability of each position in each detected keypoint heatmap to be a keypoint.

Specifically, it is assumed that there are 200 object types (such as a cat, a dog, a human, a vehicle, and an airplane) requiring keypoint detection according to the method. Different types of objects generally have different numbers of keypoints, for example, the human has 10 keypoints, and the dog has 8 keypoints, etc. The keypoints of the 200 object types are added, i.e., 10+8+ . . . , and then it is assumed that there is a first number of keypoints in total.

In the block, detected keypoint heatmaps of the first number of channels are predicted for each local regional proposal box according to the pre-trained deep neural network model to predict, in subsequent processing, a probability of the first number of keypoints to appear in a certain local regional proposal box, so as to determine whether the local regional proposal box has any type of keypoint. The keypoint heatmap can reflect the feature response degree of each position in the image. If a certain keypoint appears at a certain position in a local regional proposal box (or image), a high response also appears at a corresponding position of an obtained keypoint heatmap, and a low response appears at other positions. Whether the keypoint heatmap has a certain keypoint in the first number of keypoints can be predicted according to the response degree of each position in the keypoint heatmap.

An exemplary process for training the foregoing deep neural network model is introduced later in details, and certainly, the training of the deep neural network model is not limited to the exemplary process described here. The processing of block S220 can be implemented by using any model that can predict the first number of detected keypoint heatmaps of the regional proposal box of the object and the keypoint prediction probability of each position in each detected keypoint heatmap.

Assuming that the number of obtained local regional proposal boxes is N and the first number is K, then by means of the processing of block S220, K detected keypoint heatmaps are generated for each local regional proposal box, and N×K detected keypoint heatmaps of the N local regional proposal boxes can be obtained in total.

Then, at block S230, the keypoint in each of the at least one local regional proposal box is predicted according to the first number of detected keypoint heatmaps of the at least one local regional proposal box and the keypoint prediction probabilities.

As stated above, the pre-trained deep neural network model is configured to predict the first number of detected keypoint heatmaps of the regional proposal box of the object and the keypoint prediction probability of each position in each detected keypoint heatmap. Therefore, in a feasible solution, in terms of a local regional proposal box, a position (i.e., a point) with a keypoint prediction probability greater than a probability threshold in the M-th detected keypoint heatmap in the first number of detected keypoint heatmaps is used as the position of the M-th keypoint in the local regional proposal box, M being a positive integer less than or equal to the first number. That is to say, the first number of detected keypoint heatmaps for a local regional proposal box are subjected to the following judgment one by one: if a current detected keypoint heatmap (the M-th detected keypoint heatmap) has the position with the keypoint prediction probability greater than the probability threshold, it can be determined that the local regional proposal box has the M-th keypoint in the first number of keypoints.

It can be understood that the foregoing feasible solution is merely one of implementation modes. In practical application, a user can adjust implementation conditions or specific parameters according to actual requirements. The example of the foregoing feasible solution shall not be understood as the only implementation mode.

If the image to be detected or each local regional proposal box image is scaled before the foregoing process of obtaining the feature map of the image to be detected or each local regional proposal box image, then the M-th keypoint in the corresponding local regional proposal box can be correspondingly scaled and mapped to accurately reflect an actual position of the M-th keypoint in the local regional proposal box.

In practical application, after a keypoint in each local regional proposal box is predicted, the image can further be displayed, and the local regional proposal box and the keypoint are marked in the displayed image so as to intuitively display a keypoint detection result.

Figure 6A:
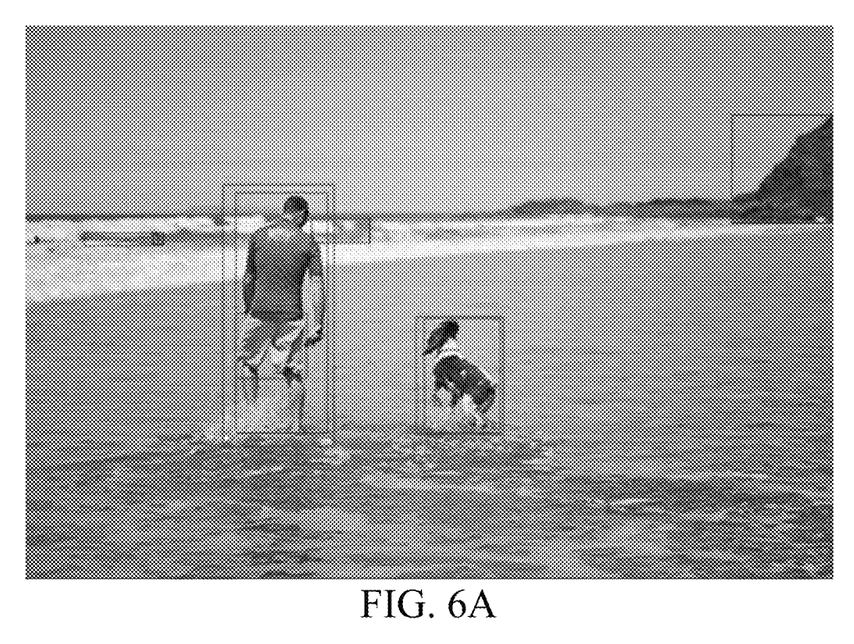
FIG. 6A is a first example image processed by the method for detecting an object keypoint according to the embodiments of the present disclosure.

FIG. 6A is an exemplary image on which local regional proposal boxes are marked. The exemplary image is a captured picture on which a person and a dog are frolicking by the sea. In order to facilitate description, local regional proposal boxes of less objects, i.e., eight objects in total, are illustrated in the exemplary image. Here, it is assumed that three objects, i.e., the dog, the person, and short pants, are to be detected, and the three objects are respectively configured to have 8, 10, and 4 keypoints. Accordingly, the total number of the keypoints of the three objects is 22. In practical operation, there are generally more object types to be detected, such as hundreds of object types, and the total number of keypoints can be up to nearly one thousand. Here, a reduction is made.

Figure 6B:
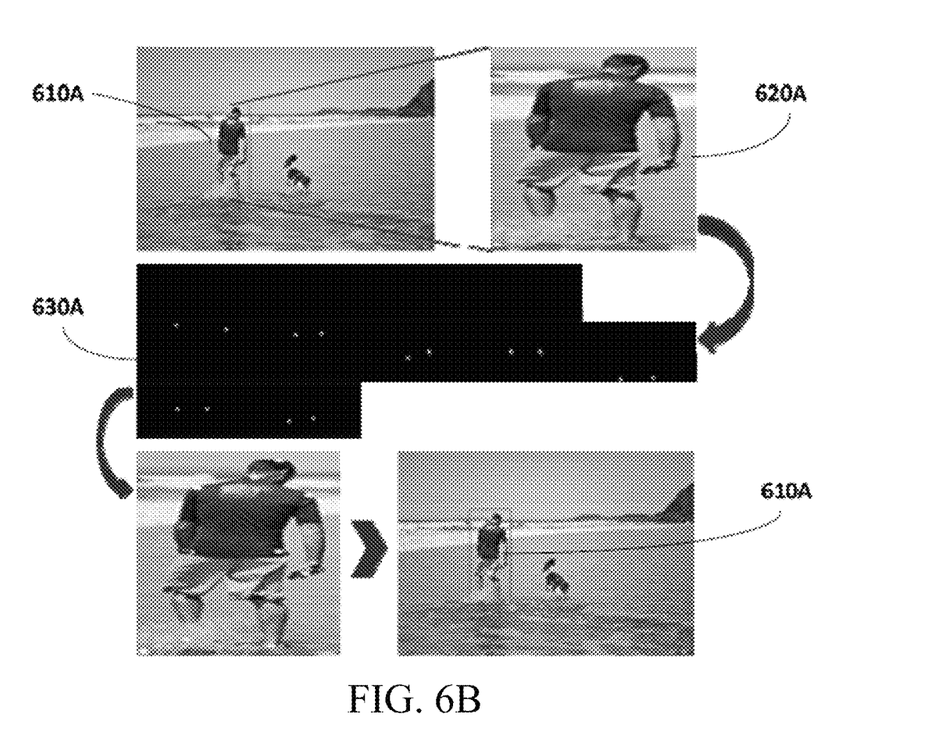
FIG. 6B is a second example image processed by the method for detecting an object keypoint according to the embodiments of the present disclosure.
Figure 6C:
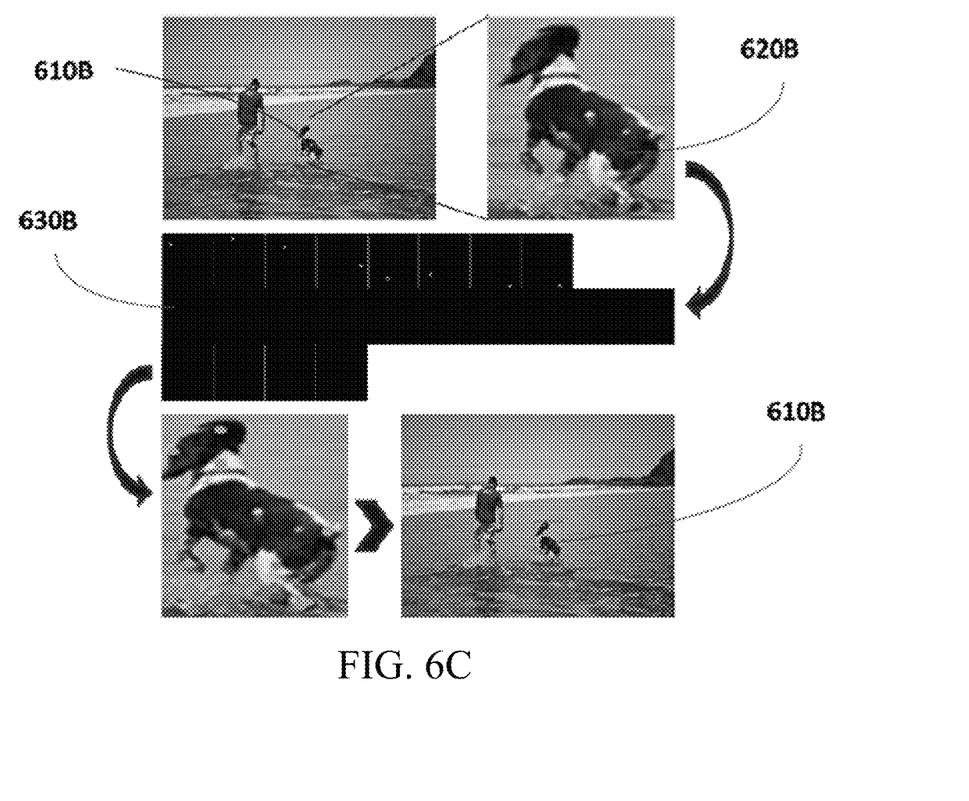
FIG. 6C is a third example image processed by the method for detecting an object keypoint according to the embodiments of the present disclosure.
Figure 6D:
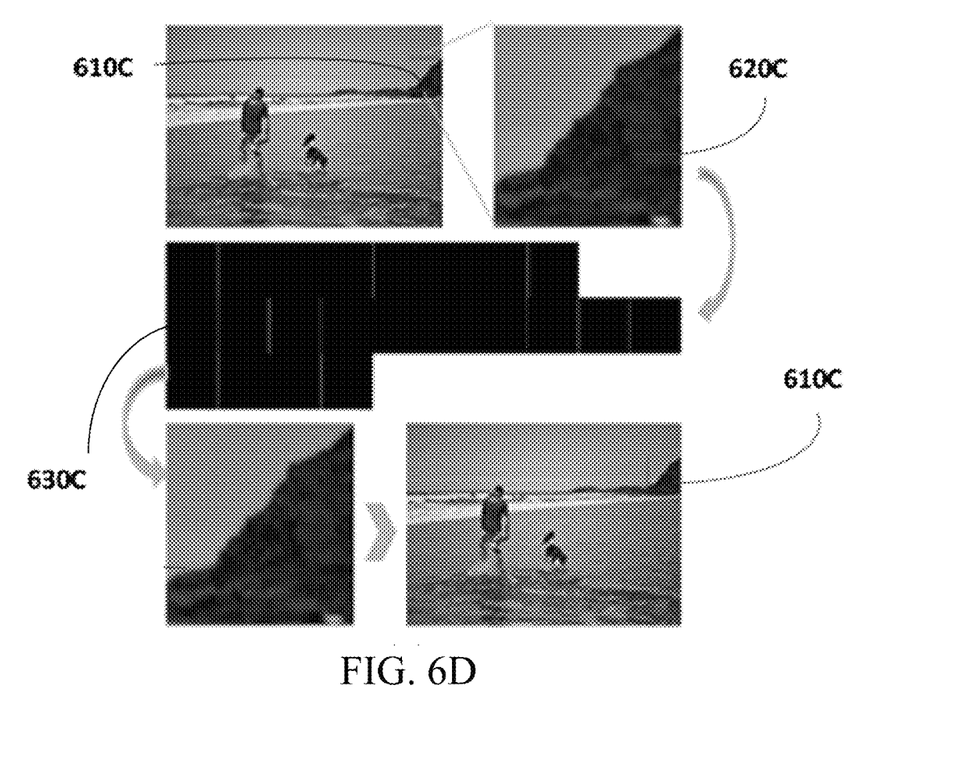
FIG. 6D is a fourth example image processed by the method for detecting an object keypoint according to the embodiments of the present disclosure.

FIGS. 6B-6D respectively illustrate exemplary processing on the three local regional proposal boxes in the exemplary image in FIG. 6A according to the foregoing blocks S210-S230. Local regional proposal box 610A includes the person and the short pants, local regional proposal box 610B includes the dog, and local regional proposal box 610C includes a hillside as a background.

Referring to FIGS. 6B-6D, at block S210, local regional proposal box images are separately cut from the exemplary image according to the positions of the local regional proposal boxes 610A, 610B, and 610C, the cut local regional proposal box images are separately stretched to a uniform size to obtain stretched local regional proposal box images 620A, 620B, and 620C, and then corresponding feature maps are obtained from the stretched local regional proposal box images 620A, 620B, and 620C.

Next, the stretched local regional proposal box image 620A is processed through block S220 to obtain detected keypoint heatmaps 630A of 22 channels. Similarly, detected keypoint heatmaps 630B and 630C of the 22 channels of the local regional proposal boxes 610B and 610C are obtained. In these heatmaps, the high response appears at the positions where the keypoints appear, and the positions are highlighted in the illustrated heatmaps. The illustrated detected keypoint heatmaps 630A, 630B, and 630C are each arranged in three rows, where eight channels in the upper row are eight keypoint channels of the dog, ten channels in the middle row are ten keypoint channels of the person, and four channels in the lower row are four keypoint channels of the short pants.

Finally, at block S230, it is predicted according to the keypoint prediction probability of each position in the detected keypoint heatmap 630A of the 22 channels of the local regional proposal box 610A that the person and the short pants in the local regional proposal box 610A have 14 keypoints in total. Since the local regional proposal box 610A does not include the dog, the heatmaps of eight channels for predicting the keypoints of the dog all fail according to the corresponding prediction probabilities, and the positions of ten keypoints of the person and the positions of four keypoints of the short pants are correspondingly predicted according to the heatmaps of ten channels for predicting the keypoints of the person and the heatmaps of four channels for predicting the keypoints of the short pants. Then, the predicted positions of the keypoints are correspondingly recovered to the original exemplary image.

Similarly, eight keypoints of the dog are predicted according to the detected keypoint heatmaps 630B of the 22 channels of the local regional proposal box 610B. Since the local regional proposal box 610C only includes the hillside as the background and does not include the person, the dog, or the short pants, the detected keypoint heatmaps 630C of the 22 channels thereof all fail and no keypoint is detected.

The method for detecting an object keypoint according to the embodiments of the present disclosure relates to separately generating keypoint prediction heatmaps of multiple keypoint channels for each local regional proposal box of at least one target object in an image to be detected according to an image feature of each local regional proposal box and then predicting, according to the generated keypoint prediction heatmaps of the multiple keypoint channels, whether the local regional proposal box has the keypoints of the corresponding channels, so it is applicable to keypoint detection for multiple objects, has strong commonality, and can reduce or even avoid the phenomenon of separately detecting/extracting a keypoint of each object. In addition, by means of the implementation of keypoint detection with the keypoint prediction heatmaps, the influence of the background on object detection can be effectively inhibited, application can be made to complex application scenes, for example, where objects overlap with each other, keypoint detection in an image is not influenced even when the position of an extracted local regional proposal box is not accurate, and strong robustness is provided.

Figure 3:
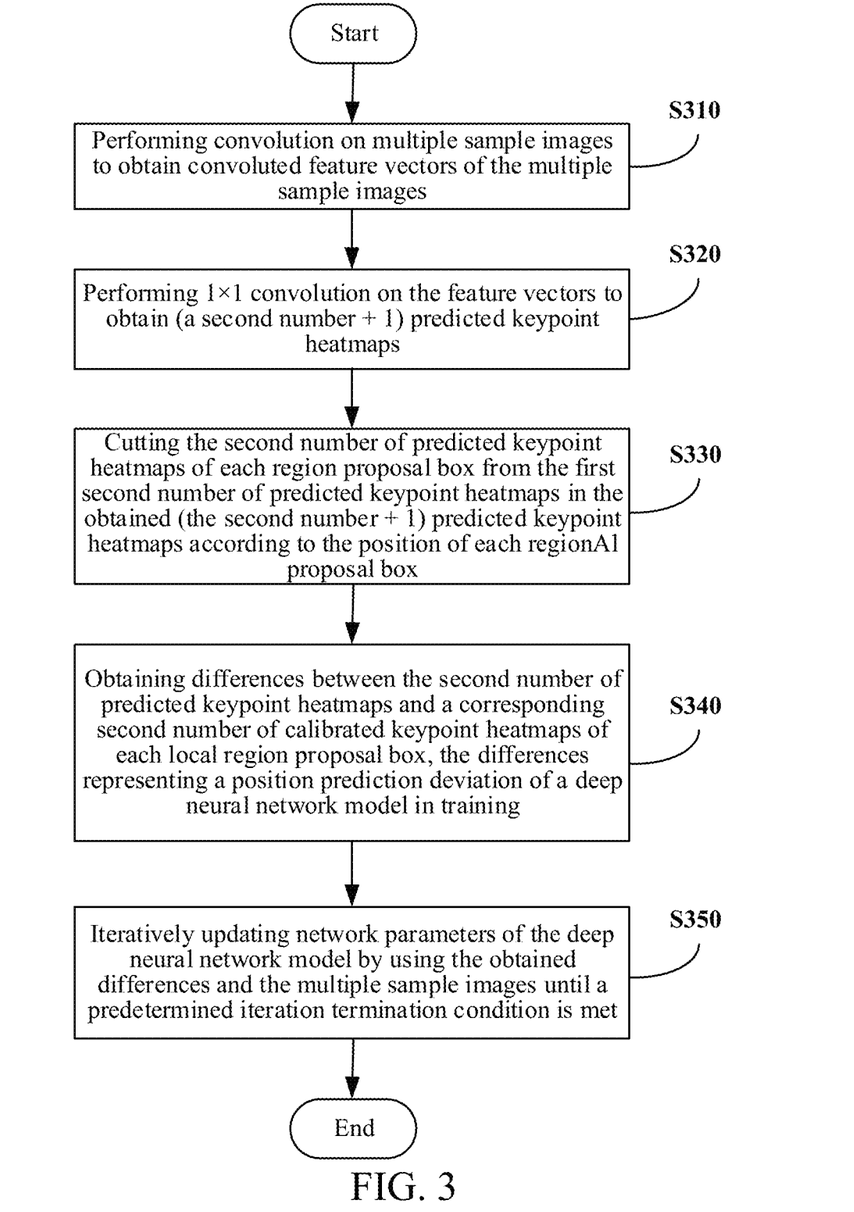
FIG. 3 is a flowchart of a process for training a deep neural network model according to an embodiment of the present disclosure.

An exemplary process for training the foregoing deep neural network model is specifically described as follows. FIG. 3 is a flowchart of a process for training a deep neural network model according to an embodiment of the present disclosure. In an optional example, the trained deep neural network model includes multiple convolution layers and a classifier layer. The deep neural network model is trained by means of multiple sample images, and the sample images are configured with a second number of calibrated keypoint heatmaps of the local regional proposal box of at least one object, where a second number of predicted keypoint heatmaps of each local regional proposal box are obtained at the end of the multiple convolution layers, and the keypoint prediction probability of each position in each predicted keypoint heatmap is output from the classifier layer. That is to say, the trained deep neural network model outputs the second number of predicted keypoint heatmaps and the keypoint prediction probability of each position in the predicted keypoint heatmaps. FIG. 3 is a flowchart of a process for training a deep neural network model according to an embodiment of the present disclosure.

Referring to FIG. 3, at block S310, feature vectors of the multiple sample images are convoluted to obtain convoluted feature vectors of the multiple sample images; and feature maps of the multiple sample images can be obtained from the feature vectors obtained by using convolution.

At block S320, 1×1 convolution is performed on the convoluted feature vectors to obtain (the second number+1) predicted keypoint heatmaps of each sample image.

Here, similar to the determination of the first number mentioned in Embodiment II above, the second number is determined according to the type of an object to be predicted by the deep neural network model to be trained and the number of predicted keypoints of the object. If the type of the object to be predicted by the trained deep neural network model is identical to the type of the target object to be detected in the foregoing embodiments, the second number is identical to the first number.

The predicted keypoint heatmaps of (the second number+1) channels of any sample image can be obtained by further performing 1×1 convolution on the convoluted feature vectors of any sample image obtained at block S310, and the (the second number+1) channels include the second number of predicted keypoints and a background channels that does not belong to any keypoint.

At block S330, a second number of predicted keypoint heatmaps of each local regional proposal box is cut from the first second number of predicted keypoint heatmaps of each sample image according to the position of each local regional proposal box. Specifically, the first second number of predicted keypoint heatmaps in the (the second number+1) predicted keypoint heatmaps obtained at block S320 are considered to be meaningful for the prediction of the second number of keypoints to be detected. Therefore, the second number of predicted keypoint heatmaps of each local regional proposal box is separately cut from the first second number of predicted keypoint heatmaps in the obtained (the second number+1) predicted keypoint heatmaps. At block S340, differences between the second number of predicted keypoint heatmaps of each local regional proposal box and a corresponding second number of calibrated keypoint heatmaps of each local regional proposal box are obtained. The differences represent a position prediction deviation of a deep neural network model in training. In addition, at the block, the keypoint prediction probabilities of different positions (points) are respectively predicted for the second number of predicted keypoint heatmaps of each local regional proposal box obtained at block S330 by means of the classifier layer provided at the end of the multiple convolution layers, and the keypoint prediction probability of each position (point) in this embodiment can be called a keypoint existence probability of each position (point).

For example, a fully connected layer of binary or N classification can be provided at the end of the multiple convolution layers to predict the keypoint existence probability of each position (point).

In this embodiment, the differences between the predicted keypoint existence probability of each position and the calibrated keypoint existence probability of the sample image can be obtained. The differences represent a deviation present in the keypoint prediction probability of the deep neural network model in training.

Then, at block S350, network parameters of the deep neural network model are iteratively updated by using the obtained differences and the multiple sample images until a predetermined iteration termination condition is met.

Specifically, the network parameters of the deep neural network model can be iteratively optimized and updated (such as using batch stochastic gradient descent method) according to the obtained differences (such as on the basis of the differences in the keypoint heatmaps, or on the basis of the differences in the keypoint heatmaps and the differences in the keypoint existence probabilities) until the network parameters of the deep neural network model meeting a convergence condition is obtained. Here, the updated network parameters of the deep neural network model include network parameters of each convolution layer and network parameters of the classifier layer. In a convolutional neural network, a reduction factor is generally set at the convolution layer to control the computation burden involved in training and prediction process of the convolutional neural network. For example, if the reduction factor with a value of 8 is set at the last feature layer of the deep neural network model and the size of the local regional proposal box is 332×332, then the size of the predicted keypoint heatmap obtained at the foregoing blocks S310-S330 is 512×42×42. Therefore, the size of the detected keypoint heatmap and the size of the predicted keypoint heatmap are both less than the size of the local regional proposal box. In this case, the foregoing block S220 in FIG. 2 further includes enlarging the first number of detected keypoint heatmaps to the size of the local regional proposal box.

According to the processing of the deep neural network model in the foregoing embodiments of the present disclosure, the deep neural network model is trained by means of the multiple sample images configured with the second number of calibrated keypoint heatmaps of the local regional proposal box of at least one object, the second number of predicted keypoint heatmaps of each local regional proposal box is obtained at the end of the multiple convolutional layers, and the keypoint prediction probability of each position in each predicted keypoint heatmap is output from the classifier layer. The trained deep neural network model outputs the detected keypoint heatmap having multiple channels of one or more objects and the keypoint prediction probability of each position in the detected keypoint heatmap, so that application can be made to keypoint detection on multiple objects, high commonality is provided, and it is not necessary to separately detect/extract the keypoint of each object. In addition, by means of the implementation of keypoint detection with the detected keypoint prediction heatmaps, the influence of a background on object detection can be effectively inhibited, application can be made to complex application scenes, for example, where objects overlap with each other, keypoint detection in an image will not be influenced even when the position of an extracted local regional proposal box is not accurate, and strong robustness is provided.

Figure 4:
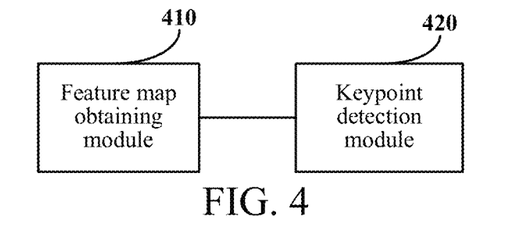
FIG. 4 is a logic block diagram of an apparatus for detecting an object keypoint according to an embodiment of the present disclosure.

FIG. 4 is a logic block diagram of an apparatus for detecting an object keypoint according to an embodiment of the present disclosure.

Referring to FIG. 4, the apparatus for detecting an object keypoint of the embodiment includes a feature map obtaining module 410 and a keypoint detection module 420.

The feature map obtaining module 410 is configured to obtain a respective feature map for each of at least one local regional proposal box in an image to be detected, the at least one local regional proposal box corresponding to at least one target object. For example, the feature map obtaining module 410 is configured to obtain respective feature maps of multiple local regional proposal boxes of the image to be detected, the multiple local regional proposal boxes corresponding to one or more target objects. For another example, the feature map obtaining module 410 is configured to obtain a respective feature map of a local regional proposal box of the image to be detected, the multiple local regional proposal boxes corresponding to one or more target objects.

The keypoint detection module 420 is configured to perform target object keypoints detection on each of the at least one local regional proposal box in the image to be detected according to the feature map for each of the at least one local regional proposal box.

The apparatus for detecting an object keypoint of this embodiment is configured to implement the corresponding method for detecting an object keypoint in the foregoing method embodiments, and has the beneficial effects of the corresponding method embodiments. Details are not described below again.

Figure 5:
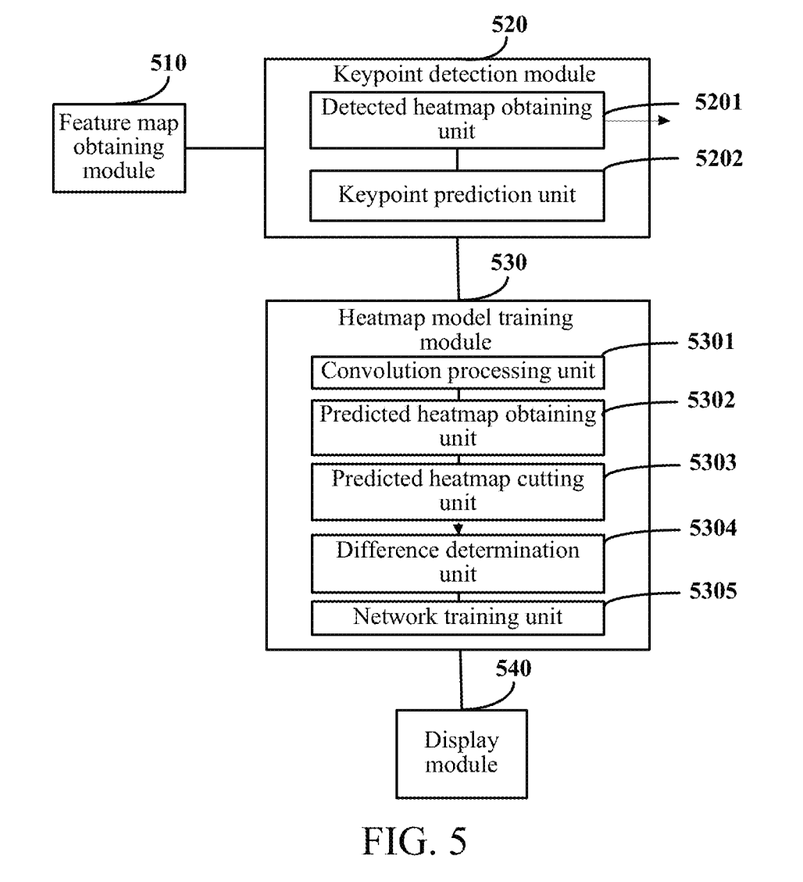
FIG. 5 is a logic block diagram of an apparatus for detecting an object keypoint according to another embodiment of the present disclosure.

FIG. 5 is a logic block diagram of an apparatus for detecting an object keypoint according to an embodiment of the present disclosure.

According to one or more embodiments of the disclosure, a feature map obtaining module 510 is configured to cut at least one local regional proposal box image from the image to be detected according to the position of the at least one local regional proposal box, and obtain a feature map of each of the at least one local regional proposal box image.

Referring to FIG. 5, according to one or more embodiments of the disclosure, a keypoint detection module 520 includes a detected heatmap obtaining unit 5201 and a keypoint prediction unit 5202.

The detected heatmap obtaining unit 5201 is configured to use for each of the feature map of each local regional proposal box as an input of a deep neural network model, and obtain a first number of detected keypoint heatmaps of each local regional proposal box and keypoint prediction probabilities, where the first number is a total number of predetermined keypoints of the detected target object keypoints, and the deep neural network model is configured to predict the first number of detected keypoint heatmaps of the regional proposal box of the object and the keypoint prediction probability of each position in each detected keypoint heatmap to be a keypoint.

The keypoint prediction unit 5202 is configured to predict the target object keypoints in any local regional proposal box according to the first number of detected keypoint heatmaps of the local regional proposal box and the keypoint prediction probabilities.

According to one or more embodiments of the disclosure, the keypoint prediction unit 5202 is further configured to enlarge the first number of detected keypoint heatmaps to the size of the local regional proposal box.

According to one or more embodiments of the disclosure, the apparatus further includes: a heatmap model training module 530 configured to train the deep neural network model through multiple sample images, the sample images being configured with a second number of calibrated keypoint heatmaps of the at least one local regional proposal box corresponding to at least one object, and the deep neural network model including multiple convolution layers and a classifier layer, where a second number of predicted keypoint heatmaps of each local regional proposal box are obtained at the end of the multiple convolution layers, and the keypoint prediction probability of each position in each predicted keypoint heatmap is output from the classifier layer.

According to one or more embodiments of the disclosure, the heatmap model training module includes:

a convolution processing unit 5301 configured to perform convolution on feature vectors of the multiple sample images to obtain convoluted feature vectors of the multiple sample images;

a predicted heatmap obtaining unit 5302 configured to perform 1×1 convolution on the convoluted feature vectors to separately obtain (the second number+1) predicted keypoint heatmaps of each sample image;

a predicted heatmap cutting unit 5303 configured to cut the second number of predicted keypoint heatmaps of each local regional proposal box from the first second number of predicted keypoint heatmaps of each sample image according to the position of each local regional proposal box;

a difference determination unit 5304 configured to obtain differences between the second number of predicted keypoint heatmaps and the corresponding second number of calibrated keypoint heatmaps of each local regional proposal box; and according to one or more embodiments of the disclosure, the difference determination unit 5304 can further obtain differences between the predicted keypoint existence probability of each position (point) and the calibrated keypoint existence probability of the sample image; and a network training unit 5305 configured to iteratively update network parameters of the deep neural network model by at least using the differences obtained by the difference determination unit and the multiple sample images. According to one or more embodiments of the disclosure, the network training unit 5305 can iteratively optimize and update the network parameters of the deep neural network model according to the difference in the keypoint heatmaps and the differences in the keypoint existence probabilities obtained by the difference determination unit 5304 until the network parameters of the deep neural network model meeting a convergence condition is obtained.

According to one or more embodiments of the disclosure, the apparatus further includes: a feature map scaling unit configured to scale the feature map of any local regional proposal box to a predetermined size before using the feature map of the at least one local regional proposal box as the input of the deep neural network model, and separately obtaining the first number of detected keypoint heatmaps of each local regional proposal box.

According to one or more embodiments of the disclosure, the keypoint prediction unit 5202 is further configured to scale the position of the determined keypoint according to a proportion corresponding to the feature map that is not scaled.

According to one or more embodiments of the disclosure, the apparatus further includes: a display module 540 configured to display the image to be detected, and mark the local regional proposal box and the keypoint in the displayed image.

In an example, the operations of the method for detecting an object keypoint may be performed by a processor by invoking a corresponding instruction stored in a memory, or may be performed by the abovementioned modules, units or subunits run by the processor.

The apparatus for detecting an object keypoint of this embodiment is configured to implement the corresponding method for detecting an object keypoint in the foregoing method embodiments, and has the beneficial effects of the corresponding method embodiments. Details are not described below again.

Figure 7:
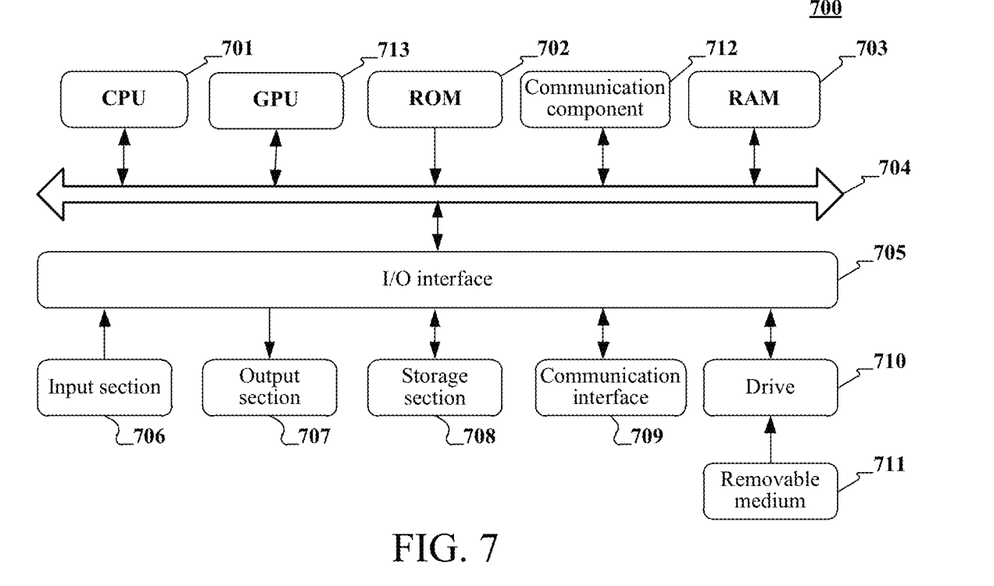
FIG. 7 is a schematic structural diagram of an electronic device according to an embodiment of the present disclosure.

The embodiments of the present disclosure also provide an electronic device which, for example, is a mobile terminal, a Personal Computer (PC), a tablet computer, a server, and the like. Referring to FIG. 7 below, a schematic structural diagram of an electronic device 700 suitable for implementing a terminal device or a server according to the embodiments of the present disclosure is shown.

As shown in FIG. 7, the electronic device 700 includes one or more processors, a communication element, and the like. The one or more processors are, for example, one or more Central Processing Units (CPUs) 701 and/or one or more Graphic Processing Units (GPUs) 713, and the processors execute an appropriate action and processing according to an executable instruction stored in a Read-Only Memory (ROM) 702 or an executable instruction loaded from a storage section 708 to a Random Access Memory (RAM) 703. The communication element includes a communication component 712 and a communication interface 709. The communication component 712 includes, but is not limited to, a network card, and the network card includes, but is not limited to, an InfiniBand (IB) network card. The communication interface 709 includes a communication interface of a network interface card such as a LAN card and a modem, and the communication interface 709 performs communication processing via a network such as the Internet.

The processor communicates with the ROM 702 and/or the RAM 730 to execute the executable instruction, is connected to the communication component 712 by means of a bus 704, and communicates with other target devices by means of the communication component 712, so as to complete operations corresponding to any method provided in the embodiments of the present disclosure, for example, obtaining respective feature maps of multiple local regional proposal boxes of an image to be detected, the multiple local regional proposal boxes corresponding to at least one target object, and separately performing target object keypoint detection on the corresponding local regional proposal box of the image to be detected according to the feature map of each local regional proposal box.

In addition, the RAM 703 further stores various programs and data required for operations of the apparatus. The CPU 701, the ROM 702, and the RAM 703 are connected to each other via the bus 704. In the presence of the RAM 703, the ROM 702 is an optional module. The RAM 703 stores executable instructions, or writes the executable instructions to the ROM 702 during running. The executable instructions cause the processor 701 to execute corresponding operations of the foregoing communication method. An input/output (I/O) interface 705 is also connected to the bus 704. The communication component 712 is integrated, or is configured to have a plurality of sub-modules (for example, a plurality of IB network cards) linked on the bus.

The following components are connected to the I/O interface 705: an input section 706 including a keyboard, a mouse and the like; an output section 707 including a Cathode-Ray Tube (CRT), a Liquid Crystal Display (LCD), a loudspeaker and the like; the storage section 708 including hardware and the like; and the communication interface 709 of a network interface card such as a LAN card and a modem. A drive 710 is also connected to the I/O interface 705 according to requirements. A removable medium 711 such as a magnetic disk, an optical disk, a magneto-optical disk, a semiconductor memory or the like is mounted on the drive 710 according to requirements, so that a computer program read from the removable medium is installed on the storage section 708 according to requirements.

It should be noted that the architecture illustrated in FIG. 7 is merely an optional implementation mode. During specific practice, the number and types of the components in FIG. 7 are selected, decreased, increased, or replaced according to actual requirements. Different functional components are separated or integrated or the like. For example, the GPU and the CPU is separated, or the GPU is integrated on the CPU, and the communication element 712 is separated from or integrated on the CPU or the GPU or the like. These alternative implementations all fall within the scope of protection of the present disclosure.

Particularly, the process described above with reference to the flowchart according to the embodiments of the present disclosure is implemented as a computer software program. For example, the embodiments of the present disclosure include a computer program product, which includes a computer program tangibly included in a machine-readable medium. The computer program includes a program code for executing a method shown in the flowchart. The program code includes corresponding instructions for correspondingly executing steps of the methods provided by the embodiments of the present disclosure, for example, obtaining respective feature maps of multiple local regional proposal boxes of an image to be detected, the multiple local regional proposal boxes corresponding to at least one target object, and separately performing target object keypoint detection on the corresponding local regional proposal box of the image to be detected according to the feature map of each local regional proposal box. In such embodiments, the computer program is downloaded from a network by means of the communication element and installed, and/or is installed from the removable medium 711. The computer program, when being executed by the CPU 701, executes the foregoing functions defined in the method of the embodiments of the present disclosure.

The methods, apparatuses, and devices in the present disclosure are implemented in many manners. For example, the methods, apparatuses, and devices in the present disclosure are implemented with software, hardware, firmware, or any combination of software, hardware, and firmware. The foregoing sequence of steps of the method is merely for description, and unless otherwise stated particularly, is not intended to limit the steps of the method in the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The descriptions above only involve specific implementations of the embodiments of the present disclosure. However, the scope of protection of the embodiments of the present disclosure is not limited thereto. Within the technical scope disclosed by the embodiments of the present disclosure, any variation or substitution that can be easily conceived of by a person of ordinary skill in the art should all be included within the scope of protection of the embodiments of the present disclosure. Therefore, the scope of protection of the embodiments of the present disclosure should be defined by the scope of protection of the claims.

The invention claimed is:

1. A method for detecting an object keypoint, comprising:
    extracting from an image to be detected, at least one local regional proposal box corresponding to a target object;
    obtaining a feature map for each of the at least one local regional proposal box;
    using the feature map for each of the at least one local regional proposal box as an input of a deep neural network model, and obtaining a first number of detected keypoint heatmaps for the at least one local regional proposal box and keypoint prediction probabilities of the detected target object keypoints; and
    predicting the target object keypoints in each of the at least one local regional proposal box according to the first number of detected keypoint heatmaps of the at least one local regional proposal box and the keypoint prediction probabilities,
    wherein the first number is less than or equal to a total number of predetermined keypoints of at least one target object, and the deep neural network model is configured to predict a first number of detected keypoint heatmaps for a regional proposal box of an object and a keypoint prediction probability that each keypoint in each detected keypoint heatmap is a target object keypoint.

2. The method according to claim 1, further comprising training the deep neural network model through the following process:
    training the deep neural network model through multiple sample images, the sample images being configured with a second number of calibrated keypoint heatmaps of the at least one local regional proposal boxes corresponding to at least one object, and the deep neural network model comprising multiple convolution layers and a classifier layer, wherein a second number of predicted keypoint heatmaps for each of the at least one local regional proposal box are obtained at the end of the multiple convolution layers, and the keypoint prediction probability that each keypoint in each predicted keypoint heatmaps is output from the classifier layer.

3. The method according to claim 2, wherein the training the deep neural network model through multiple sample images comprises:
    performing convolution on feature vectors of the multiple sample images to obtain convoluted feature vectors of the multiple sample images;
    performing 1×1 convolution on the convoluted feature vectors to obtain N+1 predicted keypoint heatmaps of each sample image, N being the second number;
    cutting, according to a position of each local regional proposal box in each sample image, the second number of predicted keypoint heatmaps of each local regional proposal box from the first second number of predicted keypoint heatmaps of each sample image;

obtaining differences between the second number of predicted keypoint heatmaps of each local regional proposal box and a second number of calibrated keypoint heatmaps of each local regional proposal box; and iteratively updating network parameters of the deep neural network model by using the obtained differences and the multiple sample images.

4. The method according to claim 3, wherein a size of each detected keypoint heatmap and a size of each predicted keypoint heatmap are both less than a size of each local regional proposal box; and the predicting the target object keypoints in each of the at least one local regional proposal box according to the first number of detected keypoint heatmaps for the at least one local regional proposal box and the keypoint prediction probabilities further comprises:

enlarging the first number of detected keypoint heatmaps to the size of the at least one local regional proposal box.

5. The method according to claim 1, wherein the predicting the target object keypoints in each of the at least one local regional proposal box according to the first number of detected keypoint heatmaps for the at least one local regional proposal box and the keypoint prediction probabilities local regional proposal box comprises:

using a keypoint with a keypoint prediction probability greater than a probability threshold in a detected keypoint heatmap with a sequence number of M in a sequence of the first number of detected keypoint heatmaps as a keypoint with a sequence number of M in a sequence in the each local regional proposal box, M being a positive integer less than or equal to the first number.

6. The method according to claim 1, before using the feature map for each of the at least one local regional proposal box as an input of a deep neural network model, and obtaining a first number of detected keypoint heatmaps for the at least one local regional proposal box, further comprising:

scaling the feature map of the at least one local regional proposal box to a predetermined size; and wherein the predicting the target object keypoints in the at least one local regional proposal box according to the first number of detected keypoint heatmaps for the at least one local regional proposal box and the keypoint prediction probabilities further comprises:

scaling the determined keypoint according to a proportion corresponding to a proportion of an unscaled feature map.

7. The method according to claim 1, wherein the obtaining the feature map for each of the at least one local regional proposal box in the image to be detected comprises:

obtaining a feature map of the image to be detected, and cutting the feature map for each of the at least one local regional proposal box from the feature map of the image to be detected according to the position of each local regional proposal box.

8. The method according to claim 1, wherein the obtaining the feature map for each of the at least one local regional proposal box in the image to be detected comprises:

cutting each of the at least one local regional proposal box image from the image to be detected according to the position of each local regional proposal box, and obtaining the feature map for each of the at least one local regional proposal box image.

9. The method according to claim 1, further comprising:

displaying the image to be detected, and marking the at least one local regional proposal box and the target object keypoints in the displayed image to be detected.

10. An apparatus for detecting an object keypoint, comprising:

a processor;

a memory for storing instructions executable by the processor;

wherein the processor executes the instructions to implement operations including:

extracting from an image to be detected, at least one local regional proposal box corresponding to a target object;

obtaining a feature map for each of the at least one local regional proposal box;

using the feature map for each of the at least one local regional proposal box as an input of a deep neural network model, and obtaining a first number of detected keypoint heatmaps for the at least one local regional proposal box and keypoint prediction probabilities of the detected target object keypoints; and predicting the target object keypoints in each of the at least one local regional proposal box according to the first number of detected keypoint heatmaps of the at least one local regional proposal box and the keypoint prediction probabilities, wherein the first number is less than or equal to a total number of predetermined keypoints of at least one target object, and the deep neural network model is configured to predict a first number of detected keypoint heatmaps for a regional proposal box of an object and a keypoint prediction probability that each keypoint in each detected keypoint heatmap is a target object keypoint.

11. The apparatus according to claim 10, wherein the processor executes the instructions to implement operations including:

training the deep neural network model through multiple sample images, the sample images being configured with a second number of calibrated keypoint heatmaps of the at least one local regional proposal box corresponding to at least one object, and the deep neural network model comprising multiple convolution layers and a classifier layer, wherein a second number of predicted keypoint heatmaps for each local regional proposal box of each sample image are obtained at the end of the multiple convolution layers, and the keypoint prediction probability that each keypoint in each predicted keypoint heatmap is output from the classifier layer.

12. The apparatus according to claim 11, wherein the training the deep neural network model through multiple sample images comprises:

performing convolution on feature vectors of the multiple sample images to obtain convoluted feature vectors of the multiple sample images;

performing 1×1 convolution on the convoluted feature vectors to obtain N+1 predicted keypoint heatmaps of each sample image, N being the second number;

cutting, according to a position of each local regional proposal box in each sample image, the second number of predicted keypoint heatmaps of each local regional proposal box from the first second number of predicted keypoint heatmaps of each sample image;

obtaining differences between the second number of predicted keypoint heatmaps of each local regional proposal box and a second number of calibrated keypoint heatmaps of each local regional proposal box; and iteratively updating network parameters of the deep neural network model by using the differences and the multiple sample images.

13. The apparatus according to claim 12, wherein a size of each detected keypoint heatmap and a size of each predicted keypoint heatmap are both less than a size of each local regional proposal box; and the predicting the target object keypoints in the at least one local regional proposal box according to the first number of detected keypoint heatmaps for the at least one local regional proposal box and the keypoint prediction probabilities further comprises:

enlarging the first number of detected keypoint heatmaps to the size of the at least one local regional proposal box.

14. The apparatus according to claim 10, wherein the predicting the target object keypoints in each of the at least one local regional proposal box according to the first number of detected keypoint heatmaps for the at least one local regional proposal box and the keypoint prediction probabilities comprises:

use a keypoint with a keypoint prediction probability greater than a probability threshold in a detected keypoint heatmap with a sequence number of M in a sequence of the first number of detected keypoint heatmaps as a keypoint with a sequence number of M in a sequence in each of the at least one local regional proposal box, M being a positive integer less than or equal to the first number.

15. The apparatus according to claim 10, wherein the using the feature map for each of the at least one local regional proposal box as an input of a deep neural network model, and obtaining a first number of detected keypoint heatmaps for the at least one local regional proposal box, the processor executes the instructions to implement operations including:

scaling the feature map of any local regional proposal box to a predetermined size;

scaling the determined keypoint according to a proportion corresponding to a proportion of an unscaled feature map.

16. The apparatus according to claim 10, wherein the obtaining a feature map of one of at least one local regional proposal box in an image to be detected comprises:

obtaining a feature map of the image to be detected, and cutting the feature map for each of the at least one local regional proposal box from the feature map in the image to be detected according to the position of each local regional proposal box;

or cutting each of the at least one local regional proposal box image from the image to be detected according to the position of each local regional proposal box, and obtaining the feature map for each of the at least one local regional proposal box image.

17. The apparatus according to claim 10, wherein the processor executes the instructions to implement operations including:

displaying the image to be detected, and marking the at least one local regional proposal box and the target object keypoints in the displayed image to be detected.

18. A non-transitory computer readable storage medium, having a computer program stored thereon, wherein the computer program comprises computer instructions, when the computer instructions being executed by a processor in the electronic device, implements the following operations:

extracting from an image to be detected, at least one local regional proposal box corresponding to a target object;

obtaining a feature map for each of the at least one local regional proposal box;

using the feature map for each of the at least one local regional proposal box as an input of a deep neural network model, and obtaining a first number of detected keypoint heatmaps for the at least one local regional proposal box and keypoint prediction probabilities of the detected target object keypoints; and predicting the target object keypoints in each of the at least one local regional proposal box according to the first number of detected keypoint heatmaps of the at least one local regional proposal box and the keypoint prediction probabilities, wherein the first number is less than or equal to a total number of predetermined keypoints of at least one target object, and the deep neural network model is configured to predict a first number of detected keypoint heatmaps for a regional proposal box of an object and a keypoint prediction probability that each keypoint in each detected keypoint heatmap is a target object keypoint.

* * * * *